United States Patent [19]

Houraney et al.

[11] Patent Number: 6,063,413
[45] Date of Patent: May 16, 2000

[54] PARTIALLY BAKED POCKET PITA BREAD AND METHOD OF MAKING SAME

[76] Inventors: F. William Houraney, 145 NW. 20th St., Boca Raton, Fla. 33431; S. M. Daneshmayeh, 10893 Gleneagles Rd., Boynton Beach, Fla. 33436

[21] Appl. No.: 08/926,208

[22] Filed: Sep. 9, 1997

[51] Int. Cl.⁷ ..................................................... A21D 10/02
[52] U.S. Cl. ........................... 426/94; 426/128; 426/138; 426/283; 426/496; 426/549
[58] Field of Search ..................... 426/128, 138, 426/94, 282, 283, 549, 496

[56] References Cited

U.S. PATENT DOCUMENTS

| | | | |
|---|---|---|---|
| 4,861,601 | 8/1989 | Seneau | 426/19 |
| 4,986,992 | 1/1991 | Glaros et al. | 426/19 |
| 5,234,705 | 8/1993 | Mani | 426/496 |
| 5,281,433 | 1/1994 | Gantwerker et al. | 426/549 |

OTHER PUBLICATIONS

Milling & Baking News, Aug. 1989.
E. J. Pyler, "Baking Science & Technology", pp. 810–811, 1988.

*Primary Examiner*—Lien Tran

[57] ABSTRACT

A partially baked and frozen Pocket Pita Bread dough that the end user simply needs to 'bake off' in order to provide an authentic, fresh and high quality Pocket Pita Bread both in a commercial and in a residential environment without the investment of labor, time, space, expertise, and expense in special equipment. The present invention provides such a product, as well as a process for the manufacturing of this product.

6 Claims, No Drawings

PARTIALLY BAKED POCKET PITA BREAD AND METHOD OF MAKING SAME

FIELD OF INVENTION

This process relates to the manufacturing of a dough which can be 'baked off' at commercial and/or residential locations where it is desired to have fresh baked Pocket Pita Bread for sale or consumption.

BACKGROUND OF THE INVENTION

"Par Baked" dough is a dough that is partially baked at the manufacturer's plant, packaged and sent to the end user, who then finishes ("bakes off") the baking and the browning of the bread or other bakery items such as cookies, bagels, croissants, etc.

Currently, the biggest market for par baked doughs is at commercial sites, (ie. retail bakeries, supermarket bakeries, restaurants, etc.) where the dough is 'baked off' to provide the customer with fresh baked bread. The obvious advantage of the par baked doughs is that it provides the means to produce fresh baked products at locations who otherwise could not financially afford the equipment, time, space, and labor necessary to produce the dough product. Thus the success of par baked doughs has been dramatic and continues to grow rapidly.

Another market for par baked doughs is the consumer. The consumer can purchase the par baked dough and the finish baking the product at home. The par baked dough can be purchased by the consumer from the freezer or the from non frozen sections in the retail outlet.

One of the primary reasons that par baked dough has achieved it's success is that it does not require an investment in special equipment. The outlets using par baked doughs can utilize their 'conventional' ovens to bake the product. Conventional ovens generally are ovens that a multitude of products (ie. bread, cakes, pies, cookies, etc.) can be baked in. These ovens are of different configurations for commercial or home use, but they all have an enclosed baking chamber wherein temperatures of approximately 500 degrees F. can be reached.

All of the par baked doughs currently in the marketplace have the following common characteristics;

1. Produced, formed, and partially baked at the manufacturing plant.
2. The product is not browned or baked to the point of browning.
3. They all can be baked off in 'conventional' ovens thus requiring no additional investment of money, space, or time on the part of the end user.

At present, although par baked dough is being produced for a wide range of bakery products, 'Pocket Pita Bread' is not one of them. The reasons for this are as follows;

1. Pocket Pita Bread dough requires temperatures far exceeding the 'conventional' oven temperature range in order to bake and brown properly.

Allthough conventional oven temperature ranges can bake Pita Bread, the time required to complete baking and browning at these temperatures is excessive and results in a poor and/or unacceptable product.

2. Pocket Pita Bread dough requires an oven where the heat source is in close proximity to the dough both on the bottom and the top of the oven.

Most 'conventional' ovens incorporate either a bottom heat source, a top heat source, and/or a convectional heat source (this method bakes by a forced flow of hot air around the product) Most of these 'conventional' ovens now in use in the marketplace do not have the top and bottom heat source working in tandem together as is required to bake quality Pocket Pita Bread properly.

3. A financial investment would be required by those wanting to bake off fresh Pocket Pita Bread, (assuming that a preformed and ready to bake Pocket Pita Bread dough is available).

In order to achieve a quality Pocket Pita Bread from the dough stage, the user would either have to purchase a new oven that is designed for Pocket Pita Bread, or retrofit their existing equipment, if possible, to accomodate the Pocket Pita Bread dough.

Pocket Pita Bread has grown in popularity in the United States, especially in the last decade. But still the sales are insignificant when compared to sales of other bread products (ie. bagels, tortillas, croissants, etc.) that have achieved rapid growth over the same period of time. The American consumer, as like any consumer in the world market, does not appreciate a bread product that does not have the 'freshness' characteristics inherent in the taste of the bread. An authentic, high qualilty Pocket Pita Bread has a very lean recipie whose 'freshness' characteristics may last one day at best. The ability of the consumer to purchase fresh Pocket Pita Bread is diminished by the fact that there are very few bakeries that produce fresh Pocket Pita Bread where the consumer can go on a regular basis. Also, the present mass merchandising of Pocket Pita Bread in the United States requires a 'shelf life' of anywhere from three days to three weeks. Thus the consumer generally receives a product which has already lost it's freshness quality. The obvious result being Pocket Pita Bread not realizing it's real market potential.

Thus, it would be desirable to prepare a Pocket Pita Bread dough that the end user simply needs to 'bake off' in order to provide a fresh and quality Pocket Pita Bread both in a commercial and in a home environment. It would also be desirable to produce a Pocket Pita Bread dough that the end user can simply 'bake off' in order to provide a fresh and quality Pocket Pita Bread, without the investment of labor, time, space, and expense in special equipment. The present invention provides such a product, as well as a process for the manufacturing of this product.

DESCRIPTION OF THE PRIOR ART

All of the prior art in this field relates to the "Par Baking" of doughs. The prior art covers this 'par baked' process for most of the breads now common in the marketplace (ie. rolls, bagels, loaf breads, hearth breads, croissants, etc.). See for example U.S. Pat. No. 4,861,601 to Seneau et al. where a crusty bread such as French Bread is preproofed, partially baked and frozen and delivered to the end user for finished baking and browning. Also see U.S. Pat. No. 4,986,992 to Glaros et al wherein the manufacture of patially baked and frozen laminated dough products such as croissants and pastries is discussed. U.S. Pat. No. 5,281,433 discloses a process for preparing a pre-cooked, microwaveable frozen baked food product wherein the food product is fully baked and then tempered by adding moisture to the outer crust to raise the moisture content of the fully baked product to within the range of from 20% to about 55% by weight.

Non of these references teach or suggest the method of the present invention for preparing a "Par Baked" and/or "Par Browned"™ Pocket Pita Bread Dough.

OBJECTS AND ADVANTAGES

Accordingly, several objects and advantages of the present invention are:

(a) to provide a Pocket Pita Bread dough that can be baked off at any commercial bakery outlet to produce a fresh, high quality Pocket Pita Bread for the customer.

(b) to provide a Pocket Pita Bread dough that can be baked off at any fooservice or restaurant outlet to produce a fresh, high quality Pocket Pita Bread for the customer.

(c) to provide a Pocket Pita Bread dough that can be baked off at the home of the consumer to produce a fresh, high quality Pocket Pita Bread.

(d) to provide a Pocket Pita Bread dough that can be baked off at any commercial bakery outlet to produce a fresh, high quality Pocket Pita Bread wherein the commercial bakery outlet can utilize it's existing conventional equipment to achieve the final product.

(e) to provide a Pocket Pita Bread dough that can be baked off at any foodservice or restaurant outlet to produce a fresh, high quality Pocket Pita Bread wherein the foodservice or restaurant outlet can utilize it's existing conventional equipment to achieve the final product.

(g) to provide a Pocket Pita Bread dough that can be baked off at the home of the consumer to produce a fresh, high quality Pocket Pita Bread wherein the consumer can utilize their existing home kitchen appliances, including but not limited to their microwave oven, to achieve the final product.

These objects and advantages are accomplished by the invention described herein.

SUMMARY OF THE INVENTION

The present invention comprises a process for preparing a partially baked and frozen Pocket Pita Bread dough, said process comprising:

(a) preparing Pocket Pita Bread dough and shaping the dough into the desired preform;

(b) proofing the preformed Pocket Pita Bread dough to a desired thickness that equals approximately 1.5 to 3 times the original thickness of the preform;

(c) partially baking, or partially baking and partially browning, or partially baking and fully browning the preform dough; and (d) freezing the partially baked product.

The present invention further comprises a product produced by the above-described process.

DETAILED DESCRIPTION OF THE INVENTION

The purpose of the method of the invention disclosed herein is to enable neighborhood bakeries, supermarket in-store bakeries, foodservice facilities, restaurants, convenience stores, home kitchens, and the like, to produce a fresh quality Pocket Pita Bread wherein existing 'conventional' baking equipment can be utilized. The purpose of the present invention is accomplished while maintaining the freshness and authenticity of Pocket Pita Bread before and after the final baking is finished by the above mentioned end users. The method described herein requires only about 1 to 3 minutes to finish the Pocket Pita Bread by baking the partially baked and/or browned dough in any type of conventional commercial or residential oven, including a microwave oven. Also the present invention does not require the use of specially skilled labor and the preferred embodiments herein may be baked to a finished product either from a frozen or a thawed state.

The type of Pocket Pita Bread desired will determine the ingredients necessary to prepare the product. For example, whole wheat bread requires a whole wheat flour, while rye bread requires a rye flour for the dough formula, onion bread would require the addition of onion to the dough while sesame seed bread may require the sesame seeds to be added to the dough or placed on the dough prior to baking. The preferred embodiments are not limited to any type or flavor of Pocket Pita Bread. Thus the dough can be prepared from any formula for Pita Bread known to those skilled in the art.

After the dough is prepared, it is formed into the desired shape by one of two methods most commonly used by those skilled in the art;

The first method is known as the "ball method" and involves dividing the dough into individual loaf portions typically weighing in the range from 0.5 to 4.0 ounces. Once the dough is scaled and divided, it is rounded into individual balls that rest before being shaped. This resting period typically is from about 5 to 15 minutes long and takes place in a pre-fermentation housing consisting of holding trays. After the individual dough-balls have rested, they are rolled into round or semi-round flat pieces by means of a rolling machine, or as it is known to those in the skilled in the art, a 'sheeter'.

The second method is known as a "sheeting line" or "die cut line" and involves sheeting the bulk dough prior to, scaling and forming it into shape. Typically the bulk dough is fed into a system of rollers. These reduction rollers, or sheeters, are positioned in a manner whereas the dough in it's bulk form, is reduced in thickness from it's original bulk form to the dough thickness needed produce the desired size of Pocket Pita Bread. This is accomplished by the dough advancing through the sheeting line and being further reduced in thickness as it passes through each of the required sheeting stages until the required dough thickness is produced. The final stage in this second method involves cutting the sheeted dough to the diameter or shape desired for the final product. This is usually accomplished by the dough, after exiting the final sheeting stage, passing under a cutting wheel. The cutting wheel is custom manufactured according to the desired diameter or shape required. Usually there are more than one of the cutting wheels so that by changing the cutting wheel, a different size or shape product can be produced. This cutting wheel continually turns on the dough sheet cutting the dough into the desired size and/or shape of the final product.

Allthough the two methods discussed above are the most widely accepted methods of producing the preform for Pocket Pita Bread dough, the invention discussed herein is by no means limited to these two methods. Indeed any method which can produce a preformed dough piece for Pocket Pita Bread can be utilized in the preferred embodiments.

After the dough is prepared and formed, by either of the methods discussed above, the flat-shaped dough pieces, or 'preforms' are then layered onto dough carrier belts in a final fermentation housing or 'proofing room'. Typically' this 'final proofer' is atmosphereically controlled to maintain temperatures in the range of 85° F. to 95° F. and the relative humidity is maintained in the range from approximately 75% to 85%. The formed dough pieces rest here for about 15 to 60 minutes before entering the oven. It should be noted here that temperatures, relative humidity, and resting time in the 'final proofer' are settings determined by the preferences of the individual skilled in the art. The ranges of these settings, as discussed above, are generally 'all inclusive' of these preferred settings.

After the preforms have rested, the pieces are transferred from the last carrier belt of the fermentation housing to the revolving belt of the oven. Typically, a Pita Bread Oven is a 'tunnel oven'. That is to say that it is a chamber wherein this chamber, or 'hearth', is fully enclosed except for a small opening in the front to allow the preforms to enter the hearth, and a slightly larger opening at the end of the hearth to allow the expanded finished baked product to exit the oven. A revolving belt delivers the preforms from the last carrier belt of the proofer room through the hearth, or baking chamber, and out of the oven. This revolving belt is typically comprised of multiple steel plates attached to a chain which advances the plates through the oven. Another configuration in general use is comprised of a steel mesh belt attached to the chain which advances the mesh belt through the oven. Still another cofiguration of this belt is a steel band wherein this sheet of thin polished carbon steel or stainless steel, is advanced through the oven by a set of pulleys at each end. In any of the above configurations, the width and length of the belt will be determined by the the production speed and product output per hour desired. Allthough the type of revolving belt may differ, all Pita Bread ovens are similar in that they are equipped with both a bottom and a top heat source which together can deliver a temperature range at the product level that is approximately 600° F. to 1000° F. Both radiant heat sources and convection heat sources, both supplied by either electricity or oil or gas, are common in this type of oven.

Upon entering the oven, the preforms are delivered through the hearth by means of the revolving belt as discussed above. The speed of the revolving belt will determine the time that the preform is exposed to the temperature within the oven. Typical bake times for Pocket Pita Bread range between 20 seconds to 1 minute to fully bake and brown the product. Again this time is determined by the preference of one skilled in the art, taking into consideration the characteristics of the end product desired. Ideally, the end product is achieved when the intense heat of the oven vaporizes the water molecules of the preformed dough to the point where this vapoization causes the preform to expand. This expansion seperates the top and bottom of the dough wherein the 'pocket' of the product is developed. After this pocket is developed, further time and exposure to the heat causes the interior of the expanded preform to develop from the dough stage to what is known as the 'crumb' of the bread. As this 'crumb' is developing, the outside, or 'crust', of the product is receiving heat to the point wherein the outside is transformed from the white dough stage to the crust stage. Upon exiting the oven, the 'crumb' is fully developed and the 'crust' has been baked to the point wherein both the top and bottom of the product is browned. Notwithstanding the exact bake time, which is a matter of preference, the end product will be a fully baked Pocket Pita Bread.

According to the preferred embodiments of the present invention, it is desired to not fully bake the preform but to partially bake without browning, or partially bake and brown only the top of the preform, or partially bake and brown only the bottom of the preform, or partially bake and brown both the top and the bottom of the preform. Each of these four desired results produced by the present invention, will provide a product that is adaptable to each of the distinct end user requirements both in the commercial and the residential market. (examples of how the present invention can be utilized by the different segments of the marketplace will follow.)

The following preferred embodiments of the present invention utilize a radiant heat source which can be supplied by either natural or propane gas, or electricity, and a revolving belt constructed of carbon steel plates which have a thickness of ¼ inch. Also, the same oven is utilized to achieve all four of the end product results by means of adjustments of the heat sources as prescribed herein;

A-1 In the first preferred embodiment of the present invention, upon entering the oven, the preform is exposed to the bottom heat source only. It is desired, in this preferred embodiment, to brown the bottom of the preform. Once again, the time that the bottom surface of the preform is exposed to the heat source, will depend on the heat source rating, (usually designated in BTU's), the speed of the revolving belt, (which is dependent on oven length, production output and the preferred result of end product desired) and also the type and the material of the revolving belt in use as discussed above. Also, the position of the heat source in relation to the steel plates of the belt is not critical, but the positioning will determine the length of time the preform will require in this initial stage in order for the bottom to be adequately browned. In this first preferred embodiment, the heat source is positioned 6 inches below the belt and is rated at 20,000 BTU's per fixture. The preform advances in this region of the oven on the heated steel plates for between 10 to 15 seconds in which time the bottom is browned as desired while the interior only begins to expand.

A-2 After the preform has been exposed as designated in this initial stage of the oven, the second stage requires the preform to advance into a region of the oven where there is neither a top or bottom heat source. This region of the oven will allow the interior of the preform to cool down so that the water vaporization is stagnated before it reaches the point wherein the vaporization causes the preform to expand and fully develop the 'pocket' and bake through the interior 'crumb' as is typically desired in the production of Pocket Pita Bread. This cooling period will take between 5 to 10 seconds.

A-3 Upon completion of the cooling, or second stage of development, the preform will advance on the continuously revolving belt to the next area of the oven wherein it is desired to brown the top of the preform. The heat sources in this region of the oven are configured to be within 1 to 2 inches above the top of the preform. This close proximity configuration of the heat source allows the top surface of the preform to be intensely exposed to the radiant heat with the result of the 'crust' developing earlier than is typically experienced. The time that the top surface of the preform is exposed to the close proximity of the heat source, will depend on the heat source rating, (usually designated in BTU's), and the speed of the revolving belt, (which is dependent on oven length, production output and the preferred result of end product desired). In this preferred embodiment of the present invention, the top surface's close proximity exposure of the preform, lasts in the range from 10 to 15 seconds under heat sources rated at 20,000 BTU's per fixture. Within this time range, the top surface of the preform will begin to brown and the interior will begin to expand.

A-4 After the preform has been exposed as designated, the fourth or final stage of development, requires the proximity of the heat sources in the oven to be positioned at a distance of 6 to 12 inches from the top of the preform. The preform advances and is exposed to the newly positioned heat source for approximately 5 to 10 seconds allowing the top 'crust' to be adequately browned and the interior to expand to the point wherein the top and bottom of the preform only begin to seperate. (As noted above, this initial seperation of the top and bottom of the preform, is the first stage in the full expansion of the product and the development of the 'crumb'.) However, the full expansion and crumb development are not desired in the present invention. Therefore the product exits the oven onto a cooling belt immediately after stage 4. This entrance into the cooling stage stagnates the expansion by depriving the additional heat neccessary to accomplish the full expansion and baking of the 'crumb'.

The final product produced by the first embodiment of the present invention is one that is browned both on top and bottom and is partially baked to the point wherein the product, or 'loaf' of Pocket Pita Bread, has initially seperated to begin the formation of the 'pocket' and the devlopment of the 'crumb'.

B-1 In the second preferred embodiment of the present invention, it is not desired to brown the bottom of the preform and therefore the bottom heat source is not ignited and utilized. Upon entering the oven, the preform passes through stage 1, as described above in A-1, without direct exposure to any heat source.

B-2 In passing through stage 2, as described above in A-2, the preform is still not exposed directly to a heat source. Although the steel plates of the revolving belt are not exposed to the bottom heat source in this preferred embodiment, the steel plates will still be sufficiently hot enough from the heat sources of stages 3 and 4, that a partially baked 'skin' on the bottom of the preform will be accomplished.

B-3 After the preform has passed through stages 1 & 2, it will advance on the continuously revolving belt to the next area of the oven wherein it is desired to brown the top of the preform. This is accomplished as discussed above in paragraph A-3.

B-4 Following the completion of stage 3, the preform will advance to the fourth or final stage of development as described above in A-4 and then will exit the oven.

The final product produced by the second embodiment of the present invention is one that is browned only on the top, the bottom is not browned but has received sufficient heat so that a partially baked 'skin' is achieved on the bottom of the preform. Also the product is partially baked to the point wherein the product, or 'loaf' of Pocket Pita Bread, has initially seperated to begin the formation of the 'pocket' and the development of the 'crumb'.

C-1 In the third preferred embodiment of the present invention it is desired to brown only the bottom of the preform. This is accomplished as described above in A-1.

C-2 After the preform has been exposed as designated in the initial stage of the oven, the second stage requires the preform to advance into a region of the oven where there is neither a top or bottom heat source. This stage is described above in A-2.

C-3 Upon completion of stage 2 of development, the preform will advance on the continuously revolving belt to the next area of the oven. In this third preferred embodiment it is not desired to brown the top of the preform but only to heat the top to the point wherein a partially baked, but not browned, 'skin' is accomplished. To achieve this result, the heat source of stage 3 is not ignited or utilized. Stage 3 thus becomes a 'no heat zone' and an extension of stage 2. This extended cooling zone acts to further stagnate the vaporization of the water molecules in the preform thus lowering their temperature to the point wherein the heat source of stage 4 can be applied to accomplish the 'skin' and the initial 'loaf' seperation desired without browning the top crust.

C-4 Following the completion of stage 3, the preform will advance to the fourth or final stage of development as described above in A-4. In advancing through stage 4, the preform will be exposed to the heat source as designated above for about 10 to 15 seconds. This is sufficient time for the preform to absorb enough heat to allow the water molecules to begin to vaporize. At the point wherein the water vaporization seperates the 'loaf' and begins the formation of the pocket and the baking of the 'crumb', the product exits the oven. The exiting from the oven at this point will cause the product to cool down thus stopping the full expansion of the 'loaf' and the baking of the 'crumb'.

The final product produced by the third embodiment of the present invention is one that is browned only on the bottom, the top is not browned but has received sufficient heat so that a partially baked 'skin' is achieved on the top of the preform. Also the product is partially baked to the point wherein the product, or 'loaf' of Pocket Pita Bread, has initially seperated to begin the formation of the 'pocket' and the development of the 'crumb'.

D-1 In the fourth preferred embodiment of the present invention it is desired to only partially bake the preform to the point wherein the product, or 'loaf' of Pocket Pita Bread, has initially seperated to begin the formation of the 'pocket' and the development of the 'crumb'. In this embodiment, it is not desired to brown either the top or the bottom of the preform. This is accomplished as described above in A-1 except that the preform's exposure to the bottom heat source is limited to up to 5 seconds so that direct heat can be initiated into preform without producing a browning of the bottom 'crust'.

D-2 After direct heat is initiated into preform in the initial stage of the oven, the second stage requires the preform to advance into a region of the oven where there is neither a top or bottom heat source. This stage is described above in A-2.

D-3 Upon completion of stage 2 of development, the preform will advance on the continuously revolving belt to the next area of the oven. In this fourth preferred embodiment it is not desired to brown the top of the preform but only to inject additional heat into the preform to further bring the preform closer to the bake point desired. This is accomplished as described above in A-3 except that the preform's exposure to the top heat source is limited to up to 10 seconds so that direct heat can be initiated into preform without producing a browning of the top 'crust'.

C-4 Following the completion of stage 3, the preform will advance to the fourth or final stage of development as described above in A-4. In advancing through stage 4, the preform will be exposed to the heat source as designated above for about 5 to 10 seconds. This is sufficient time for the preform to absorb enough heat to allow the water molecules to begin to vaporize. At the point wherein the water vaporization seperates the 'loaf' and begins the formation of the pocket and the baking of the 'crumb', the product exits the oven. The exiting from the oven at this point will cause the product to cool down thus stopping the full expansion of the 'loaf' and baking of the 'crumb', and the browning of the top crust.

The final product produced by the fourth embodiment of the present invention is one that is not browned either on the top or bottom, but has received sufficient heat so that a partially baked 'skin' is achieved on the top and bottom of the preform. Also the product is partially baked to the point wherein the product, or 'loaf' of Pocket Pita Bread, has initially seperated to begin the formation of the 'pocket' and the development of the 'crumb'.

Upon exiting the oven, the finished product is transferred onto a cooling belt. The product is cooled and then delivered to a freezing chamber. The loaves are flash frozen so that a minimum amount of moisture is lost in the cooling and freezing stages. The product will be packaged in a plastic wrapper or film either prior to or after it is flash frozen depending on the freezing method and the preferences of those skilled in the art. Finally, the frozen and packaged product is stored in a storage freezer at about 0° F.

EXAMPLES

As noted above, each of the four desired results produced by the present invention, will provide a product that is adaptable to each of the distinct end user requirements both in the commercial and the residential market. One of the truly unique aspects of the processing is the browning of the outside without fully baking the product. In most conventional ovens, this browning cannot be achieved without a bake time that results in an overbaked and toasted Pocket Pita Bread. This 'Par Browned'™ feature eliminates these undesired results by shortening the time necessary to bake the product. The product provided by the invention therefore calls for the end user to simply 'bake off' the product in order to produce a finished and authentic, freshly baked Pocket Pita Bread.

Examples are as follows;

1) The product accomplished in the first embodiment of the present invention will allow the end user to produce a delicious and authentic, freshly baked Pocket Pita Bread, by using either a microwave oven, a convection oven, or any type of conventional oven wherein there is no direct heat source that is sufficient to brown the outside 'crust' of the loaf within the required bake time.

2) The product accomplished in the second embodiment of the present invention will allow the end user to produce a delicious and authentic, freshly baked Pocket Pita Bread, by using a revolving plate oven, a residential oven, or any type of conventional oven wherein there is no direct top heat source that is sufficient to brown the top 'crust' of the loaf within the required bake time.

3) The product accomplished in the third embodiment of the present invention will allow the end user to produce a delicious and authentic, freshly baked Pocket Pita Bread, by using a broiler type oven, or any type of conventional oven wherein there is no direct bottom heat source that is sufficient to brown the bottom 'crust' of the loaf within the required bake time.

4) The product accomplished in the fourth embodiment of the present invention will allow the end user to produce a delicious and authentic, freshly baked Pocket Pita Bread, without the additional time, expense, space, and expertise necessary to make the dough and preform, by using a pita bread oven, or any type of conventional hearth oven wherein there is both a top and bottom direct heat source that is sufficient to brown the top and bottom 'crust' of the loaf within the required bake time.

The present invention may be embodied in other specific forms without departing from the spirit or essential characteristics thereof. For example, a different type of oven may be used or the stages as defined above may be reconfigured or resequenced to produce the same results.

The presently disclosed embodiments are therefore to be considered in all respects as illustrative and not restrictive, the scope of the invention being indicated by the appended claims, rather than the foregoing description, and all changes which come within the meaning and range of equivilancy of the claims are therefore intended to be embraced therein.

What is claimed is:

1. A method of producing a frozen dough product which can be baked in various types of conventional ovens to provide a finished baked product with the characteristics, texture, flavor, and aroma of fresh baked Pocket Pita Bread, comprising, the steps of:
    (a) preparing dough and shaping the dough into the desired preform;
    (b) proofing said preform to a thickness that equals about 1.5 to 3 times the original thickness in an atmosphereically controlled environment where temperatures are maintained in the range of approximately 85° F. to 95° F. and the relative humidity is maintained in the range of approximately 75% to 85%
    (c) applying heat to said preform so that a full baking of said preform is not achieved and the vaporization of the water molecules in said preform is only initiated to a point wherein the formation of the pocket and the development of the crumb are stagnated;
    (d) removing said preform from said heat immediately after step (c) is accomplished;
    (f) cooling said preform of step (d); and then,
    (g) flash freezing said preform of step (f).

2. The method of claim 1 wherein the heat source of step (c) is controlled so that the said heat source only initiates the vaporization of the water molecules but does not brown either the top or the bottom of the exterior of said preform, whereby this partially baked preform will provide to the end user the ability to produce a fresh baked Pocket Pita Bread by using any type of conventional oven wherein there is both a top and a bottom heat source, or a heat source that is sufficient to brown the top and bottom crust of the loaf, and finish the development of the pocket and crumb.

3. The method of claim 1 wherein the heat source of step (c) is controlled so that the said heat source initiates the vaporization of the water molecules and browns both the top and the bottom of the exterior of said preform, whereby this partially baked and browned preform will provide to the end user the ability to produce a fresh baked Pocket Pita Bread, by using a microwave oven, or a convection oven, or any type of conventional oven wherein there is not a heat source that is sufficient to brown the outside crust and fully develop the pocket and crumb of the loaf.

4. The method of claim 1 wherein the heat source of step (c) is controlled so that the said heat source initiates the vaporization of the water molecules and browns the exterior top of said preform without browning the exterior bottom of said preform, whereby this partially baked and partially browned preform will provide to the end user the ability to produce a fresh baked Pocket Pita Bread, by using a broiler type oven, or any type of conventional oven wherein there is no direct bottom heat source or there is not a heat source that is sufficient to brown the bottom crust and fully develop the pocket and crumb of the loaf.

5. The method of claim 1 wherein the heat source of step (c) is controlled so that the said heat source initiates the vaporization of the water molecules and browns the exterior bottom without browning the exterior top of said preform, whereby this partially baked and partially browned preform will provide to the end user the ability to produce a fresh baked Pocket Pita Bread, by using a revolving plate oven, or a residential oven, or any type of conventional oven wherein there is no direct top heat source or there is not a heat source that is sufficient to brown the top crust and fully develop the pocket and crumb of the loaf.

6. The method of claim 1 which further comprises baking said preform until it is browned and the pocket is expanded to provide a finished baked product with the characteristics, texture, flavor, and aroma of fresh baked Pocket Pita Bread.

\* \* \* \* \*